(12) United States Patent
Pekarsky et al.

(10) Patent No.: US 7,875,171 B2
(45) Date of Patent: Jan. 25, 2011

(54) SUCTION FILTER FOR AN AUTOMATIC TRANSMISSION

(75) Inventors: Lev Pekarsky, W. Bloomfield, MI (US); Timothy A. Droste, Howell, MI (US); Gary H. Hafemeister, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 601 days.

(21) Appl. No.: 11/933,575

(22) Filed: Nov. 1, 2007

(65) Prior Publication Data
US 2009/0114578 A1    May 7, 2009

(51) Int. Cl.
*B01D 35/02* (2006.01)
*B01D 35/147* (2006.01)
(52) U.S. Cl. ...................................... 210/132; 210/472
(58) Field of Classification Search ......... 210/130–133, 210/472
See application file for complete search history.

(56) References Cited

U.S. PATENT DOCUMENTS

| | | | |
|---|---|---|---|
| 6,582,593 | B2 | 6/2003 | Wolford et al. |
| 6,648,146 | B2 | 11/2003 | Beer et al. |
| 6,911,141 | B2 * | 6/2005 | Stamey et al. ................. 210/85 |
| 2003/0132147 | A1 | 7/2003 | Rosendahl et al. |
| 2005/0087481 | A1 | 4/2005 | Boast et al. |
| 2005/0098508 | A1 | 5/2005 | Caldwell |
| 2006/0180541 | A1 | 8/2006 | Hueppchen et al. |

* cited by examiner

*Primary Examiner*—Terry K Cecil
(74) *Attorney, Agent, or Firm*—David B. Kelley; MacMillan, Sobanski & Todd, LLC

(57) ABSTRACT

A filter assembly includes a filter housing including an inlet, through which hydraulic fluid enters the housing, and an outlet, through which hydraulic fluid exits the housing, valve housing containing a bypass valve located adjacent the inlet in a chamber, the valve including an orifice that opens and closes in response to differential pressure across the valve, and a screen secured to the valve housing and covering the orifice, the screen having a fine mesh for removing contaminants from the fluid that flows through the valve.

12 Claims, 3 Drawing Sheets

SUCTION FILTER FOR AN AUTOMATIC TRANSMISSION

BACKGROUND OF THE INVENTION

1. Field of the Invention

This invention relates generally to a filter assembly and, in particular, to a filter for removing contaminants in automatic transmission fluid (ATF) contained in an oil pan.

2. Description of the Prior Art

Hydraulic fluid, which circulates continuously through an automatic transmission and an external oil cooler, reenters a transmission oil pan from the cooler through a filter, whose purpose is to remove contaminants entrained in the fluid. A hydraulic pump is supplied with fluid from the outlet of the filter. A bypass valve may be arranged in parallel flow path with a filter element such that the valve opens and closes in response to differential pressure across the valve.

When the valve is open, however, the filter is bypassed, thereby potentially allowing large contaminants to reenter and recirculate through the transmission.

During cold temperature operation when the valve is open, air may enter the filter assembly and accumulate in large bubbles, which exit the filter and enter the intake of the pump, thereby causing slug-like fluid flow or spikes, which can produce pressure instability downstream of the pump and adversely affect the pump prime.

Undesired high pressure differential across the valve, caused by cold temperature operation and restrictions in the flow path leading to the valve inlet, may cause excessively long periods when the bypass valve is open and the filter is inoperative.

A need exists in the industry for a filter that avoids bypass valve instability due to fluctuations in pump suction flow, excessive differential pressure across a bypass valve, and air entrapment in the housing of a fluid filter.

SUMMARY OF THE INVENTION

A filter assembly includes a filter housing including an inlet, through which hydraulic fluid enters the housing, and an outlet, through which hydraulic fluid exits the housing, valve housing containing a bypass valve located adjacent the inlet in a chamber, the valve including an orifice that opens and closes in response to differential pressure across the valve, and a screen secured to the valve housing and covering the orifice, the screen having a fine mesh for removing contaminants from the fluid that flows through the valve.

The a channel includes a second inlet communicating with the chamber and located adjacent the valve, a second outlet communicating with the outlet of the valve housing, and a length connecting the second inlet and second outlet, the channel increasing in elevation as distance from the second inlet along the channel length increases.

When valve is open during cold temperature operation, air that accumulates in the valve passes along the channel in small, dispersed bubbles and enters the pump intake, thereby avoiding bypass valve instability due to fluctuations in pump suction flow and loss of pump prime.

To minimize the length of time that the bypass valve is opened during periods when the ATF temperature is low, the valve is located immediately adjacent the inlet 18, where the valve is most exposed to relatively warm ATF flow returning to the oil pump. The valve housing is rounded at its end to create an unrestricted flow path that promotes flow of fluid toward the valve and filter housing inlet.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
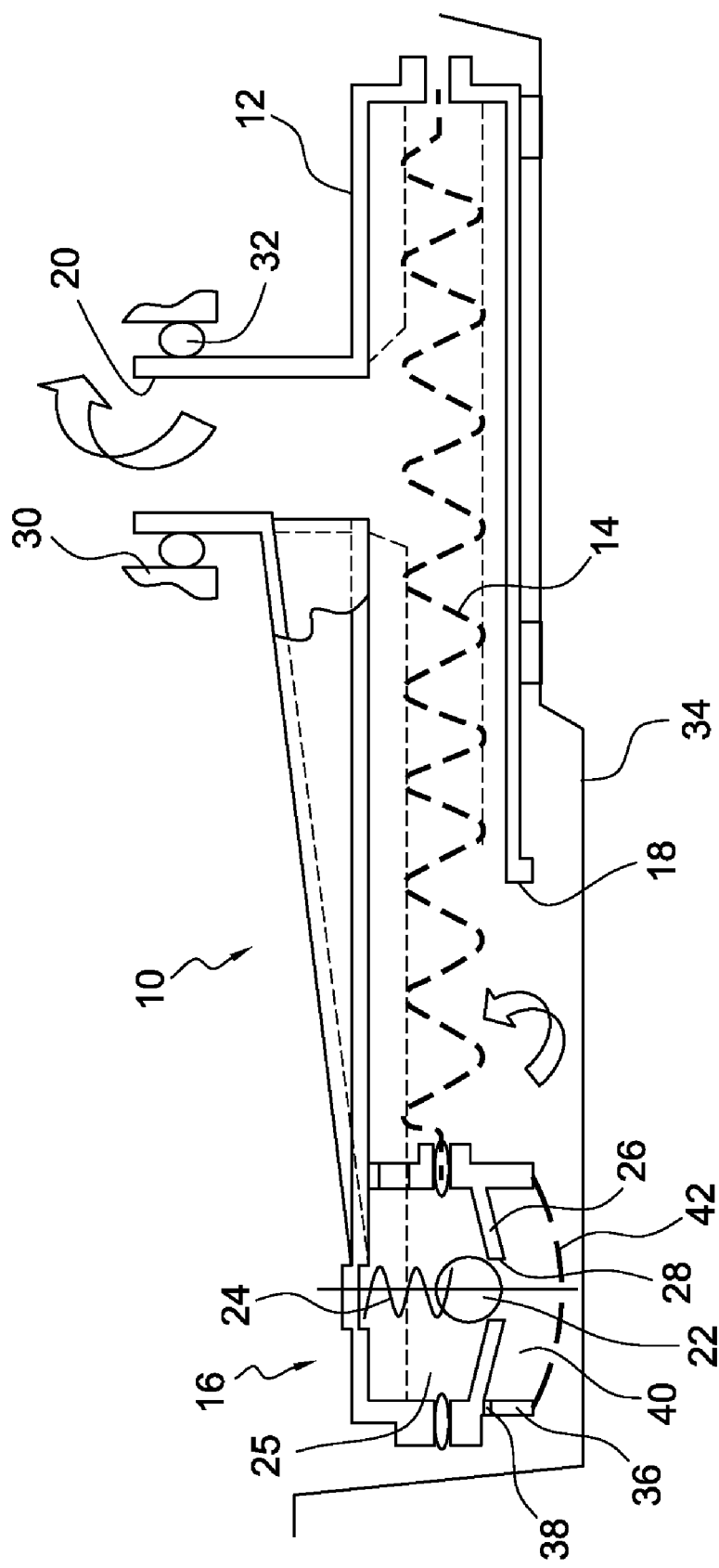
FIG. 1 is a side view of a filter assembly including suction filter element and bypass valve located in the oil sump of an automatic transmission.

The suction filter assembly 10 shown in FIG. 1 includes a filter housing 12, filtration media 14 and pressure bypass valve 16. Filtration media 14 is directly molded to filter housing 12 and separates a housing inlet 18 and a housing outlet 20 so that all of the ATF, i.e., transmission fluid, that enters though through the inlet also passes through media 14 and outlet 20 when valve 16 is closed. Filtration media 14 is able to filter small particulate matter entrained in the ATF.

The pressure bypass valve 16 is a normally-closed check valve having a ball 22 that is biased by a spring 24 toward contact with a seat 26, formed with an orifice 28. Ball 22 and spring 24 are located in a valve chamber 25 located at a higher elevation than seat 26. Valve 16 closes when ball 22 contacts seat 26. Valve 16 opens when ball 22 moves upward out of contact with seat 26 against the force of spring 24 due to differential fluid pressure across the valve.

Filter outlet 20 is located in the suction inlet 30 of a transmission pump. A seal 32, fitted into an annular space between the filter outlet 20 and pump inlet 30, prevents leakage of ATF.

Filter inlet 18 is located near the lowest point of the transmission sump 34, called an oil pan, and below the elevation of the surface of the ATF in the oil pan 34.

To prevent ingesting air while valve 16 is open and bypassing ATF from inlet 18, valve housing 36 is provided with a small vent hole 38 located at the top of valve cavity 40. Air entrained in ATF that accumulates in valve cavity 40 can escape through the hole 38. To improve the escape of air from valve cavity 40, valve seat 26 has the form of a truncated cone such that the vent hole 38 is located at the base of the cone and above the elevation of the valve orifice 28.

To minimize the length of time that bypass valve 16 is opened during periods when the ATF temperature is low, valve 16 is located immediately adjacent filter inlet 18 where the valve is most exposed to relatively warm ATF flow returning to the oil pump.

Figure 2:
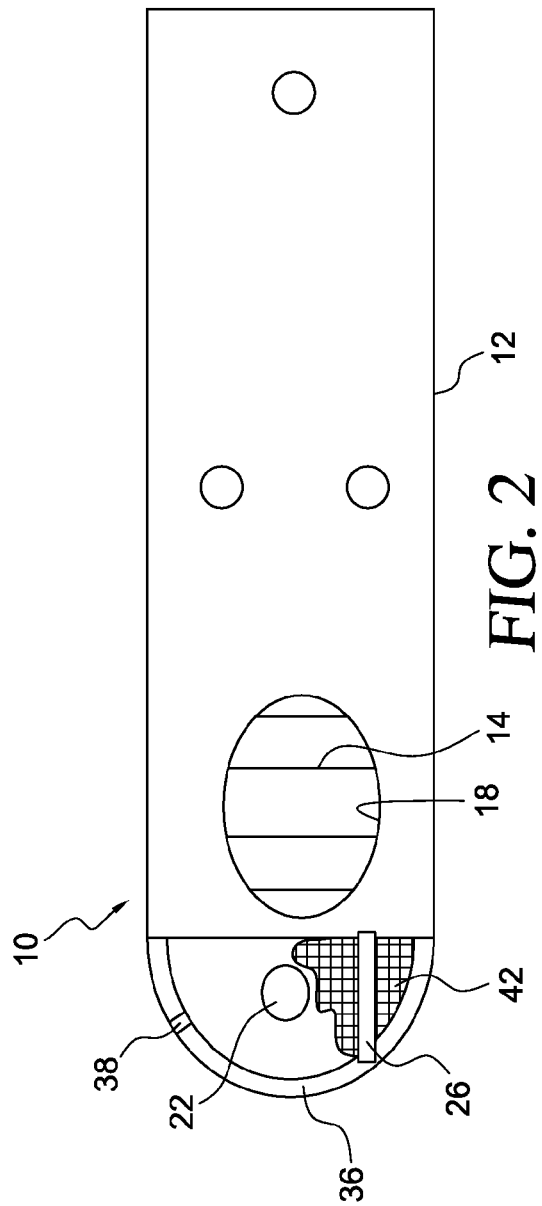
FIG. 2 is bottom view of the filter assembly of FIG. 1.
Figure 3:
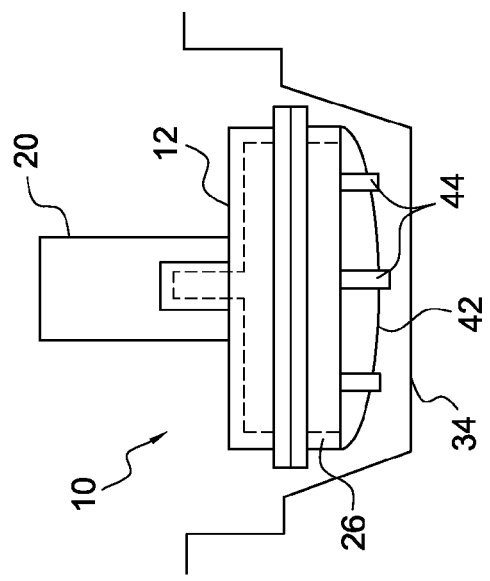
FIG. 3 is an end view of the filter assembly of FIG. 1.
Figure 4:
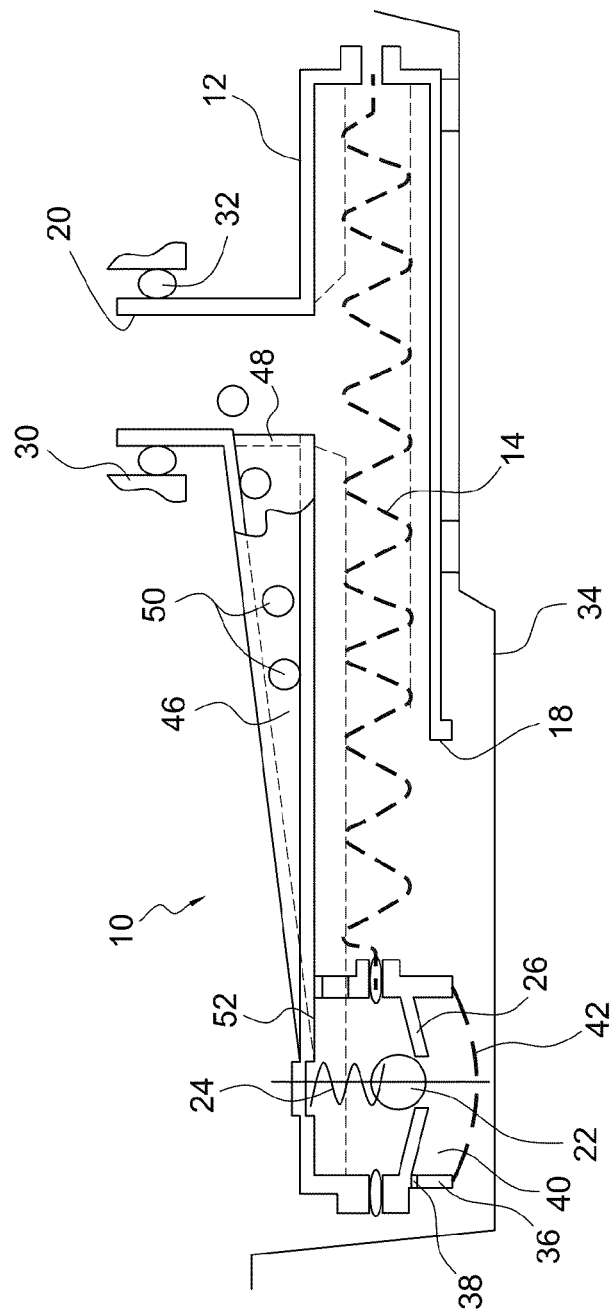
FIG. 4 is a side view of a filter assembly showing a channel containing air bubbles.

As FIG. 2 illustrates, valve housing 36 is rounded at its end to create an unrestricted flow path that promotes flow of fluid in sump 34 toward bypass valve 16 and filter housing inlet 18.

To reduce excessive flow restriction through bypass valve 16 during cold temperature operation, as shown in shown FIGS. 1-4, the valve orifice 28 is covered by a screen mesh 42, which has the form of a spherical dome to maximize the surface area of the screen. To further maximize the area of screen 42 the area of its surface covers the rounded portion of the housing 36, where valve 16 is located and not only the area of the valve. Molded ribs 44, formed in valve housing 36, follow the spherical shape of screen 42 and support the screen against collapsing due to fluid pressure. Screen 42 filters large particulate matter carried in the ATF when valve 16 is open and bypassing fluid through the valve.

To reduce pressure spikes at the suction pump due to valve 16 rapidly opening and closing under pulsing suction flow conditions, bypass valve 16 is located downstream and spaced far from the filter assembly outlet 20, to ensure maximum differential pressure between filter outlet 20 and valve inlet 28. This location tends to cause filter housing 12 to act as an accumulator, thereby attenuating and dampening pressure spikes.

To prevent the ability of air that might accumulate downstream of bypass valve 16 or in the filtration media 14 from exiting through the filter outlet 20 and entering the pump inlet in a large bubble, filter housing 12 is formed with a slopped air channel 46 or multiple slopped channels, which extend from the area of bypass valve 16 to the filter assembly outlet 20. The air channel 46 merges with outlet 20 through an opening 48 at the highest elevation of the slopped channel 46. Instead of air entering outlet 20 in a large bubble, air that may accumulate above bypass valve 16 is divided into small bubbles 50 at the entrance 52 to channel 46. The small bubbles move rightward in the channel 46, pass through opening 48 and exit through outlet 20 as small bubbles.

In accordance with the provisions of the patent statutes, the preferred embodiment has been described. However, it should be noted that the alternate embodiments can be practiced otherwise than as specifically illustrated and described.

What is claimed is:

1. A filter assembly, comprising,
   a housing including an inlet, an outlet, and a filtration element;
   a bypass valve in a valve housing, adjacent the inlet, including an orifice, a screen secured to the valve housing and covering the orifice, a ball, a spring biasing the ball to close the orifice, pressure across the valve opening the orifice to allow fluid to bypass the filtration element;
   a valve cavity lower in elevation than the orifice, communicating outside the housing through a hole higher in elevation than the orifice.

2. The filter assembly of claim 1, further comprising a channel formed in the housing, the channel comprising:
   a second inlet communicating with the chamber and located adjacent the bypass valve;
   a second outlet communicating with the outlet; and
   a length connecting the second inlet and second outlet, the channel increasing in elevation as distance from the second inlet along the channel length increases.

3. The filter assembly of claim 1, further comprising a channel formed in the housing, the channel comprising:
   a second inlet located adjacent the bypass valve;
   a second outlet communicating with the outlet;
   a length connecting the second inlet and second outlet; and
   a depth that increases along the channel length, the channel increasing in elevation as distance from the second inlet along the channel length increases.

4. The filter assembly of claim 1, further comprising:
   the filtration element located in the housing and extending from the bypass valve toward the housing outlet.

5. The filter assembly of claim 1, wherein the bypass valve further comprises:
   a valve seat, the orifice being formed in the valve seat.

6. The filter assembly of claim 1, wherein the bypass valve further comprises:
   a valve seat, the orifice being formed in the valve seat; and
   ribs for supporting the screen.

7. A filter assembly
   a housing including an inlet, an outlet, a filtration element and a channel including a second inlet communicating with a chamber, a second outlet communicating with the outlet, connecting the second inlet and second outlet and increasing in elevation as distance from the second inlet along the channel increases;
   a valve housing;
   a bypass valve in the valve housing, adjacent the inlet and including an orifice, a screen secured to the valve housing and covering the orifice, a ball moveably into contact with the valve orifice to close the orifice, and out of contact with the valve orifice to open the orifice, a spring biasing the ball to close the orifice, pressure across the valve tending to open the orifice to allow fluid to bypass the filtration element;
   the valve cavity lower in elevation than the orifice, communicating outside the housing through a hole at a higher elevation than the orifice.

8. The filter assembly of claim 7 further comprising:
   a screen in the form of a dome supported by ribs, the screen including a mesh covering the orifice.

9. The filter assembly of claim 7, wherein the channel further includes a depth that increases along the channel length, the channel increasing in elevation as distance from the second inlet along the channel increases.

10. The filter assembly of claim 7, further comprising:
    the filtration element located in the housing and extending from the bypass valve toward the outlet.

11. The filter assembly of claim 7, wherein the housing further comprises:
    a valve seat formed with the orifice.

12. The filter assembly of claim 7, wherein the housing further comprises:
    a valve seat formed with the orifice; and
    ribs for supporting the screen.

* * * * *